UNITED STATES PATENT OFFICE 2,638,269

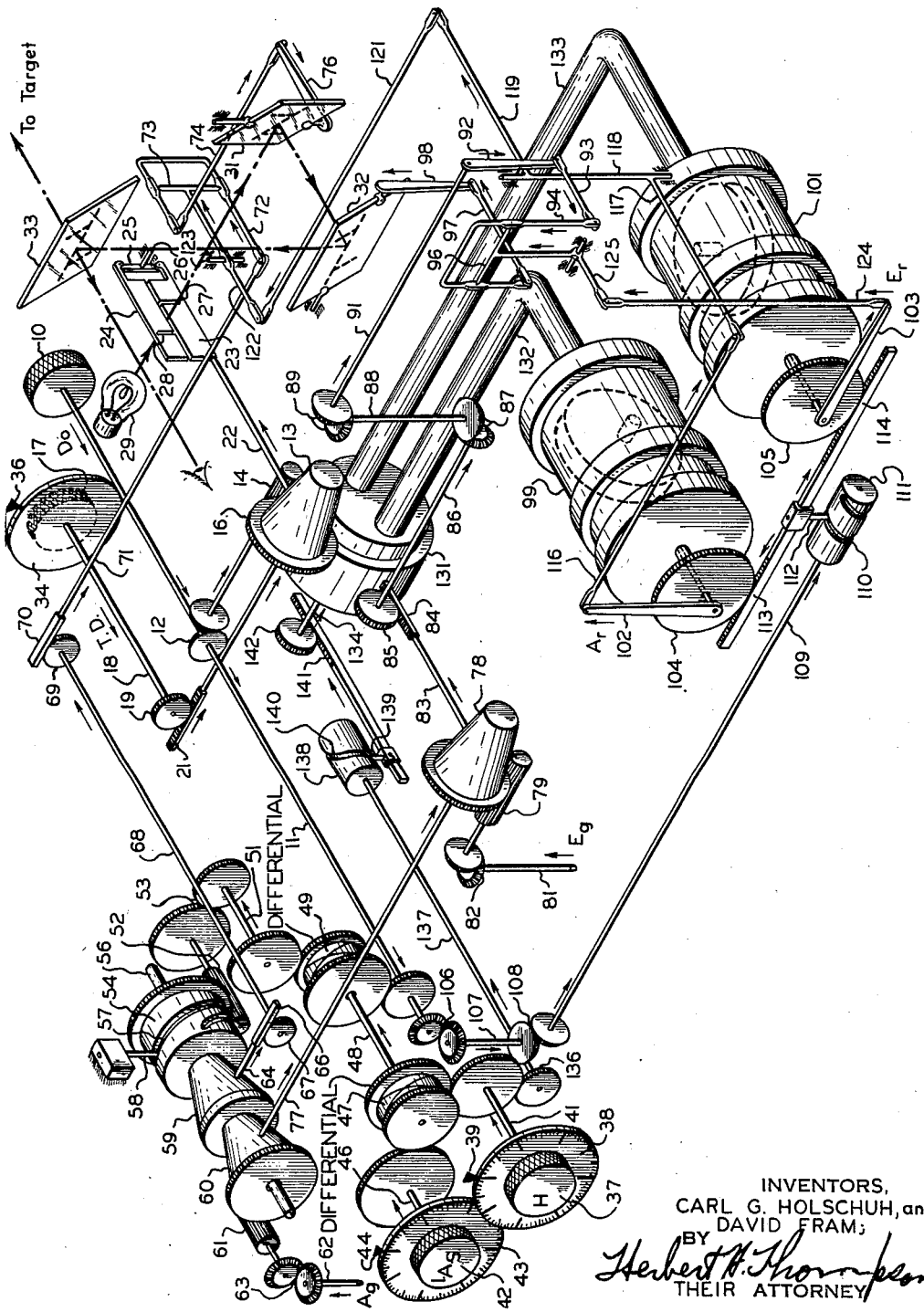

BALLISTIC MECHANISM

Carl G. Holschuh, Huntington, and David Fram, Brooklyn, N. Y., assignors to The Sperry Corporation, a corporation of Delaware Application August 22, 1942, Serial No. 455,968

3 Claims. (Cl. 235—61.5)

The present invention is related to the art of computing gun sights.

In prior copending application Serial No. 358,382, for Computing Aircraft Gun Sight, filed September 26, 1940, in the names of C. G. Holschuh and O. A. Vielehr and assigned to the same assignee as the present invention, there is disclosed a computing gun sight for aircraft which is supported directly on and carried by the gun. The gun is directly actuated by the gunner, in this case by direct manual actuation, and the gun sight contains a mechanism adapted to compute the required lead angle between the target orientation and the gun orientation, and to offset the reticle defining the line of sight of the computing gun sight by an amount and in a sense corresponding to this lead angle. The gunner then rotates the gun and sight to maintain the line of sight directed toward the target, whereby the gun is properly oriented for directing a projectile toward the target.

In this prior application, however, the computing gun sight was highly simplified and is useful only under a restricted range of conditions, in order to decrease weight and simplify construction. Thus, the mechanism is adapted to produce correct lead angles only for a fixed airspeed and a fixed altitude of the craft. For other airspeeds and other altitudes, the lead angle introduced by the mechanism is only approximately correct, so that the utility of the device is somewhat limited. With recent types of aircraft, it is necessary to permit wide variations in altitude and indicated airspeed during actual combat operations in which the computing gun sight would be utilized. One method of introducing these two quantities as variables in the computing mechanism is disclosed in a similar computing gun sight in copending application Serial No. 411,186 for Interaircraft Gun Sight and Computer, filed September 17, 1941, in the names of C. G. Holschuh and D. Fram and also assigned to the same assignee as the present application.

In this latter application, a setting control is provided for indicated airspeed, whereby the apparatus may be set at the actual airspeed of the craft and so that this airspeed may then be taken into account by the mechanism. At the same time, changes in altitude, which have essentially the same effect as changes in airspeed of opposite sense, are taken into consideration in the mechanism by offsetting the indicated airspeed control by an amount corresponding to the craft altitude as determined by the relationship for true airspeed which equates this quantity to the product of indicated airspeed times a function of the air density ratio. However, in this type of computing mechanism, it is necessary to resolve the indicated airspeed (which has the same effect as a wind of similar velocity blowing along the longitudinal axis of the craft) into components along the orientation of the gun, that is, along the path of the projectile, and at right angles thereto, in order to isolate the head wind and cross wind effects of this relative wind. However, such resolving mechanisms are cumbersome and awkward to use, introducing definite errors and complicating the construction and manufacture of the device.

According to the present invention, an aircraft computing gun sight of a type similar to that shown in application 358,382 is provided, which allows for the effects of changes of altitude and indicated airspeed, and avoids the necessity for the wind resolving mechanisms, such as that shown in application Serial No. 411,186 and formerly believed to be necessary. In the present invention, it has been found that in place of utilizing such a wind resolving mechanism, the elevation and azimuth lead angle components $\phi_s$ and $\delta$ respectively due to the effects of relative wind, gravity and projectile spin, may be determined by a particular method of mechanical computation in which the azimuth ballistic correction $\delta$ is determined as a function of two quantities, one of these quantities being the actual azimuth component of the gun orientation ($A_g$) and the other of these quantities being in turn a composite function of target slant range ($D_0$), indicated airspeed (IAS) and altitude (H), this latter composite function being a product of further functions of these particular quantities individually, as will be described in detail below. The elevation ballistic correction or super-elevation $\phi_s$ may be determined as a function of the gun azimuth ($A_g$), the gun elevation ($E_g$) and the same function of slant range ($D_0$), indicated airspeed (IAS), and altitude (H) used in determining the azimuth ballistic correction $\delta$.

In addition, the present invention utilizes improved apparatus for determining the rate of change of target bearings i. e., angular rate of the gun or sight, and for deriving therefrom the components of the lead angle due to motion of the target during the time of flight of the projectile. For this purpose a pair of rate gyroscopes is used, similar to those disclosed in the patent to Charles S. Draper, 2,291,612, for Turn Indicators, dated August 4, 1942, and also in copending applications Serial Nos. 385,916, for Fire Control Apparatus, filed March 29, 1941, in the names of C. S. Draper and E. P. Bentley and application 440,660 for Lead Computing Devices, filed April 27, 1942, in the names of C. S. Draper and E. P. Bentley. As is shown in these applications 385,916 and 440,660, a pair of rate gyroscopes is mounted upon the gun in such fashion that they measure the rates of change of orientation of the gun about the elevation axis and an axis normal to the slant plane which is defined as a plane including the longitudinal and trunnion axes of the gun. The sensitivity of these rate gyroscopes is then adjusted in accordance with the projectile time of flight, whereby the output derived therefrom represents the product of angular gun rate by time of flight, which is taken to be one prediction component of the required gun lead angle. In the present application, the time of flight thus utilized for adjusting the rate gyro sensitivity is derived directly from the slant range of the target.

Furthermore, since such gyroscopes are generally airspun from a suitable air pump, and since the output of some pumps varies with altitude, which would ordinarily cause a change in rate gyro speed and therefore its sensitivity with altitude, further means may be necessary for adjusting the output of the air pump in accordance with the altitude to maintain constant spin velocity for the rate gyros, whereby they are rendered insensitive to changes in altitude.

Accordingly it is an object of the present invention to provide improved computing gun sights for aircraft adapted to produce improved accuracy with increased simplicity of construction, over a wider range of conditions of use.

It is another object of the present invention to provide improved computing gun sights for aircraft of the type in which the line of sight defined by the gun sight is carried by the gun and is also displaced relatively to the gun by the computing mechanism, and in which the effect of changes in altitude and changes in airspeed of the craft may be taken into consideration, whereby the range of use of the device may be greatly extended and its accuracy improved over prior art devices.

It is a further object of the present invention to provide an improved computing mechanism for inter-aircraft computing gun sights which takes into consideration the effect of changes in altitude and indicated airspeed without requiring the use of mechanical resolving mechanisms, whereby increased simplicity of construction and higher accuracy may be obtained.

It is still a further object of the present invention to provide improved computing gun sights for aircraft utilizing rate gyros for obtaining prediction corrections for the line of sight and wherein these gyros are compensated for the effects of change in altitude in order to render them useful over all altitudes likely to be encountered.

Other objects and advantages will become apparent as the description proceeds.

The single figure shows a perspective schematic representation of the entire computing gun sight of the present invention. The arrows indicate the direction of control influences.

It is to be understood that the entire apparatus shown in the figure is suitably mounted upon the gun, in a relationship to be described, and thereby rotates together with the gun both in elevation and azimuth, the gun being suitably controlled either by direct manual control or by manually-controlled power means.

Also controlled by the operator or gunner is a range control 10 which actuates a range shaft 11. Shaft 11 operates through suitable gearing 12 to rotate a three-dimensional cam 13 by means of an elongated pinion 14 and a gear 16 fixed to cam 13. Cam 13 is also axially positioned by means of a target dimension control 17 by way of shaft 18, pinion 19, and rack 21. The follower 22 of cam 13 translates one member 23 of the range-finding reticle, a second member 24 of which is thereby translated equally and oppositely, by virtue of its opposite connection to lever 25 having a fixed pivot as at 26. Member 23 is provided with a slot 27 and member 24 with a slot 28, through which light rays from a suitable source of illumination, indicated schematically as a light bulb 29, are projected onto an azimuth mirror 31, then reflected into the elevation mirror 32 and thereby to a reflex mirror 33, which serves to superpose this image of the reticle formed by slots 27 and 28 upon the image of the object or target. Such a range finder is also shown in copending application Serial No. 358,382.

In operation, target dimension control 17, which cooperates with a suitable scale 34 and index 36, is set at the known or assumed value of wing spread of the target. The range control is then actuated by the gunner until the image of slots 27 and 28 as seen through the reflex mirror 33 just circumscribes or outlines the target. This is the desired tracking condition.

Target dimension dial 34 is calibrated preferably in logarithms of target dimension. Cam 13 is so laid out that when positioned in translation by the target dimension control 17, the displacement of range shaft 11 required to position the cam in rotation to adjust the reticle so as to bracket the target will be proportional to the natural logarithm of a function of the slant range $D_0$. The function is determined empirically for each kind of projectile from ballistic tables furnished by the Government.

Preferably, this function of slant range is the ratio of the actual target slant range to a predetermined slant range datum.

This angular displacement of slant range shaft 11 is then modified by being added to other angular displacements made in accordance with logarithms of functions of altitude and indicated airspeed empirically determined from the ballistic tables for the particular projectile used. Thus, an altitude control knob 37 is provided carrying a scale 38 cooperating with a fixed index 39. The scale 38 is so calibrated that setting knob 37 to a predetermined altitude, corresponding to the craft altitude, will rotate altitude shaft 41 through an angle having a predetermined functional relationship to the actual craft altitude. An example of one form of functional relationship which has been found to be satisfactory for a known projectile, is proportional to the expression:

$$-0.0488 \left[\log_e \frac{H}{3000}\right]^2 + .0713 \left[\log_e \frac{H}{3000}\right]$$

An indicated airspeed control 42 is also provided having a scale 43 cooperating with a fixed index 44 and actuating a shaft 46. The scale upon indicated airspeed knob 42 is so calibrated that when the mark on scale 43 corresponding to the craft airspeed is set opposite index 44, IAS shaft 46 will be angularly displaced from a predetermined neutral or zero position by an amount proportional to a predetermined function of the craft indicated airspeed. A satisfactory form for this predetermined function has been found to be the following:

$$1.171 \log_e \frac{IAS}{100}$$

for airspeeds between 100 and 200 miles per hour, and $$.189\left[\log_e\left(\frac{IAS-100}{100}\right)\right]^{2.7}$$

for airspeeds between 200 and 400 miles per hour.

The angular displacement of shaft 41 is added to that of shaft 46 within a conventional differential 47, and the angular displacement of the output 48 thereof is added to the displacement of shaft 11 by a further differential 49. The output of differential 49 displaces a shaft 51, in accordance with a combination of functions of slant range, altitude, and indicated airspeed, given by the following expression:

$$\left.\begin{array}{l}1.171 \log_e \dfrac{IAS}{100} \\ \text{or} \\ .189\left[\log_e\left(\dfrac{IAS-100}{100}\right)\right]^{2.7}\end{array}\right\} + 1.035 \log_e \frac{D_0}{200} + .0713 \log_e \frac{H}{3000} - .0488\left[\log_e \frac{H}{3000}\right]^2$$

This resultant angular displacement of shaft 51 then serves to proportionally rotate a pinion 52 by way of gearing 53, and thereby serves to displace an anti-logarithmic cam 54 by a proportional amount. Cam 54 is rotatably mounted upon a shaft 56 and carries a groove 57 cooperating with a follower 58 fixed to the gun or casing of the computing gun sight. Thus, as cam 54 is rotated by means of pinion 52, the action of follower 58 in groove 57 serves to axially translate the cam 54. The form of groove 57 on the body of cam 54 is so chosen that the axial displacement of cam 54 will be proportional to the anti-logarithm of the angular displacement of the cam 54 produced by pinion 52, and hence to the anti-logarithm of the above combination. It is to be noted that this axial motion of cam 54 is thus proportional to a product of individual functions of airspeed, altitude and slant range.

Axially translatable with cam 54, but rotated independently thereof, are a pair of cams 59 and 60, which are rigidly fixed together and are rotated simultaneously by means of pinion 61 driven from a shaft 62 by way of gearing 63, in accordance with the angular displacement of the gun in azimuth from a predetermined datum which, may be termed gun azimuth $A_g$. Cams 59 and 60 are ballistic cams which amount to mechanical ballistic tables. The cams in each case are laid out empirically for a given type of projectile according to well known practice to effect displacement of their respective lift pins in accordance with the ballistic deflection required for each combination of cam input displacements. In the case of cam 60, as will be described presently, the displacement of the lift pin thereof is modified by a further cam 78. Cam 59 is so designed that the resultant lift of its cam follower 64 will be proportional to the azimuth ballistic correction $\delta$ corresponding to the particular values of slant range, gun azimuth, indicated airspeed, and altitude set into the mechanism in the manner described for the particular projectile for which the cam is designed.

This motion of cam follower 64 is then transferred by way of rack 66, pinion 67, shaft 68, pinion 69, rack 70, and arm 71 to rotate lever 72 about a pivot 73 (whose position is determined in a manner to be described) and thereby correspondingly actuates an arm 74 pivotally connected to a crank 76 fixed to azimuth mirror 31, and hence mirror 31 is angularly displaced by an angle corresponding to the azimuth ballistic correction $\delta$ necessary to compensate for the effect of relative wind (airspeed), and projectile spin upon the path of the projectile.

The follower 77 of the second cam 60 serves to axially position a further cam 78, which is rotated by means of pinion 79 from shaft 81 through gearing 82 in accordance with the elevational angular displacement ($E_g$) of the gun from a predetermined datum. Cams 60 and 78 are so designed that the resultant lift of cam follower 83 of cam 78 will be the super-elevation correction $\phi_s$.

In accordance with a feature of the invention, the effect on the projectile of the air speed of the plane together with the density of the air, the azimuth angle of the gun, and slant range of the target are taken into consideration along with the changing elevation angle of the gun and a correction for gravity in computing vertical ballistic deflection.

Cam 60 is laid out to compute for a predetermined constant gun elevation angle, the vertical ballistic deflection required for the particular combination of variables by which the cam is displaced. Lift pin 77 accordingly translates cam 78 according to this ballistic data for constant gun elevation. Cam 78 is rotated in accordance with the changing gun elevation angle. The cam is laid out empirically to correct the data from cam 60 in accordance with changing gun elevation. Included in the data on the cam surface is a correction for gravity, the lift pin 83 being displaced in accordance with the vertical ballistic deflection.

This lift of follower 83 is then transferred by way of rack 84, pinion 85, shaft 86, gearing 87, shaft 88, gearing 89, shaft 91, and crank 92 fixed to shaft 91, to a pivotally-connected link 93 which operates a crank arm 94 pivoted about a shaft 96. Motion of crank 94 about shaft 96 correspondingly displaces a link 97 pivoted to a crank 98 fastened to the pivot axis of mirror 32, and thereby angularly displaces mirror 32 through an angle corresponding to the super-elevation correction $\phi_s$.

In addition to the ballistic corrections $\delta$ and $\theta_s$ required between the orientations of the target and the gun, an additional "prediction" correction in azimuth and elevation must be supplied to allow for the motion of the target during the time of flight of a projectile. This correction in the present instance is supplied by the respective azimuth and elevation rate gyros 99 and 101.

These gyros are mounted on the gun in such manner that the spin axis of the azimuth gyro 99 is parallel to the elevation trunnion axis of the gun and the spin axis of the elevation rate gyro 101 is perpendicular to the slant plane containing the elevation gun trunnion axis and the longitudinal axis of the gun. These gyros are preferably of the type shown in above-mentioned copending application Serial No. 440,660, wherein the angular displacement of their respective output arms 102 and 103 from predetermined respective datum positions is proportional to the angular velocity of the gyro mount about axes perpendicular to their respective spin axes.

In the case of the azimuth gyro 99, this rate is measured about an axis perpendicular to the slant plane containing the elevation trunnion axis and the longitudinal axis of the gun, and hence measures the gun slant pant azimuth rate. In the case of the elevation rate gyro 101, this rate is measured about the elevation trunnion axis of the gun, and determines the gun elevation rate.

As described in the above-mentioned application Serial No. 440,660, the sensitivity of these gyros, namely, their output angular displacements for a predetermined impressed angular velocity, may be suitably adjusted, as by adjustment of control members 104 and 105. In the present case, this sensitivity is adjusted in proportion to the time of flight T of the projectile, whereby the output angular displacements of cranks 102 and 103 are respectively proportional to time of flight T times the angular velocity of the gun in slant plane azimuth and in elevation, respectively. These quantities may be termed, respectively, the slant plane azimuth prediction correction, and the elevation prediction correction.

For this purpose, shaft 11, which, as has been described, is rotated in accordance with a predetermined logarithmic function of slant range $D_0$, is connected through gearing 106, shaft 107, gearing 108, and shaft 109 to a cylindrical cam 111, whose follower 112 is connected to racks 113 and 114, respectively engaging gears formed on or connected to sensitivity control members 104 and 105. As is known, the time of flight T of a projectile to a close order of accuracy is a function solely of slant range $D_0$, all other variables being resolved in the determination. Cam 111 is a delogging cam and has its groove 110 so formed that the translational displacement of racks 113 and 114 in response to the angular displacement of slant range control shaft 11 will be in proportion to the time of flight T corresponding to the slant range $D_0$ determining the displacement of shaft 11.

The angular displacement of crank 102, proportional to the azimuth prediction correction, is then transmited by way of a pivoted link 116, a crank 117 pivoted about shaft 118 and fixed to crank 119, and a pivoted link 121 to lever 122, which is pivoted about an axis 123 fixed to the instrument housing. Lever 122 is also rigidly connected to pivot axis 73, already described.

It will be seen that arm 71 is determined as to position by the apparatus already described. Accordingly, any displacement of lever 122 about axis 123 must result in a motion of pivot axis 73 and crank 72 about the pivot joining crank 72 and arm 71. This results in a further component of motion of arm 74 corresponding to the azimuth prediction correction, so that the mirror 31 is angularly displaced by the sum of the slant plane azimuth prediction and ballistic corrections, which amount to the entire slant plane azimuth lead angle. In effect, therefore, crank 72, lever 122, and pivot 73 form a mechanical lever differential whose output, derived from arm 74, represents the sum of the inputs to arms 121 and 71.

In similar fashion, the elevation prediction correction is led by way of link 124 and crank 125 to a similar lever differential and thereby also rotates the elevation mirror 32, which is thus angularly displaced in accordance with the elevation lead angle equal to the sum of the elevation prediction correction and the super-elevation correction.

Since mirrors 31 and 32 are carried by the gun, it will be seen that the resultant displacement produced in the reticle image will correspond both in magnitude and sense to the lead angle which the gun must bear with respect to the line of sight of the target. The system is so adjusted that for zero prediction and ballistic corrections, the line of sight defined by the reticle will coincide with the gun orientation. Accordingly, when a target is tracked so that its image is maintained centralized between the vertical arms of the reticle image formed by slots 27 and 28, the target orientation thus defined will be displaced from the gun orientation by the amount of the proper lead angle and, accordingly, under these circumstances, the gun will be exactly oriented for properly directing the projectile fired from the gun. In this way, a simple and accurate computing gun sight adapted to be used over a wide range of variation of gun orientations approximating a complete hemisphere is provided.

Gyros 99 and 101 are preferably air spun by means of a suitable air pump 131 connected to the respective gyros 99, 101 by respective air ducts 132 and 133, in the manner shown in application Serial No. 440,660. The output deflection from rate gyros of the present type is truly proportional to the angular velocity impressed thereon only when they are maintaining constant spin velocity. Normally, as the craft changes altitude, resulting in a variation in air density, the output from a pump such as 131 would vary in accordance with the altitude, thereby varying the spin velocity of the gyros. To prevent this, according to the present invention, the pump rate is adjusted in correspondence with the altitude of the craft to maintain constant spin velocity of the gyros. This is done in the present instance by utilizing a variable output pump having a control member 134 which is adapted to vary the output in ducts 132 and 133. Such pumps are well-known and their details form no part of the present invention.

Connected to altitude control 37, as by way of gearing 136 and shaft 137, is a cam 138, whose follower 139 is connected to a rack 141 cooperating with a pinion 142 connected to the pump control 134. The groove 140 of cam 138 is so formed that the spin velocities of gyros 99 and 101 will remain constant so long as the altitude set in by means of control 37 corresponds to the actual altitude of the craft. In this way, errors due to change in altitude which would otherwise be encountered, are prevented.

It will be clear that the above type of prediction lead angle determining apparatus need not be restricted to use directly on the gun, but may be mounted on a dummy gun or a sight.

As many changes could be made in the above construction and many apparently widely different embodiments of this invention could be made without departing from the scope thereof,

What is claimed is:

1. In a ballistic computer for airborne ordnance, a plurality of manually adjustable knobs having individual logarithmic dials, differential means actuated by said knobs according to logarithms of predetermined functions of altitude and air speed of the supporting aircraft and slant range of a target, anti-logarithm means actuated by the output of the differential means for providing a linear output displacement proportional to the product of said functions, three-dimension ballistic cam means displaced in one dimension by the output of the anti-logarithm means and in another dimension according to gun azimuth, the ballistic cam means being laid out to provide output ballistic deflections according to magnitude of the displacements imparted to the cam.

2. In a ballistic computer for airborne ordnance, a plurality of manually adjustable knobs having individual logarithmic dials, differential means actuated by the knobs according to logarithms of predetermined functions of altitude and air speed of the supporting aircraft and slant range of a target, an anti-logarithm cam member displaced by the output of the differential means in accordance with the sum of the logarithms of said functions for producing an output displacement proportional to the product of said functions, ballistic cam means comprising a pair of ballistic cams displaced on one dimension by the output of the anti-logarithmic cam member, and in another dimension according to gun azimuth, the ballistic cams being laid out respectively to provide output displacements in accordance with the lateral ballistic deflection, and the vertical ballistic deflection, the latter being based on some predetermined constant gun elevation.

3. In a ballistic computer for airborne ordnance, a plurality of manually adjustable knobs having individual logarithmic dials, differential means actuated by the knobs according to logarithms of predetermined functions of altitude and air speed of the supporting aircraft and slant range of a target, an anti-logarithm cam member displaced by the output of the differential means in accordance with the sum of the logarithms of said functions for producing an output displacement proportional to the product of said functions, a pair of ballistic cams fixed to each other displaced in one dimension by the output of the anti-logarithm cam member, and in another dimension according to gun azimuth, one ballistic cam being laid out to provide an output displacement according to lateral ballistic deflection, and the other to provide a displacement according to vertical ballistic deflection at constant gun elevation, and means comprising a further cam displaced in one dimension by the latter ballistic cam and in another dimension according to gun elevation for providing vertical ballistic deflection corrected for gun elevation.

CARL G. HOLSCHUH.
DAVID FRAM.

References Cited in the file of this patent

UNITED STATES PATENTS

| Number | Name | Date |
| --- | --- | --- |
| 1,291,031 | Leavitt | Jan. 14, 1919 |
| 1,482,152 | Ross | Jan. 29, 1924 |
| 1,801,329 | Carter et al. | Apr. 21, 1931 |
| 2,065,303 | Chafee et al. | Dec. 22, 1936 |
| 2,133,489 | Smith | Oct. 18, 1938 |
| 2,175,143 | Cornelius | Oct. 3, 1939 |
| 2,206,875 | Chafee et al. | July 9, 1940 |
| 2,235,826 | Chafee | Mar. 25, 1941 |
| 2,248,141 | Von Manteuffel | July 8, 1941 |
| 2,385,348 | Chafee | Sept. 24, 1945 |
| 2,396,701 | Holschuh | Mar. 19, 1946 |

FOREIGN PATENTS

| Number | Country | Date |
| --- | --- | --- |
| 499,265 | Great Britain | Jan. 20, 1939 |

OTHER REFERENCES

Ser. No. 212,349, Papello (A. P. C.), published May 25, 1943.